(12) United States Patent
Walters et al.

(10) Patent No.: US 10,785,171 B2
(45) Date of Patent: Sep. 22, 2020

(54) CHAT BOT UTILIZING METAPHORS TO BOTH RELAY AND OBTAIN INFORMATION

(71) Applicant: Capital One Services, LLC, McLean, VA (US)

(72) Inventors: Austin Grant Walters, McLean, VA (US); Fardin Abdi Taghi Abad, Champaign, IL (US); Jeremy Edward Goodsitt, McLean, VA (US); Robert P. Seaton, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/270,587

(22) Filed: Feb. 7, 2019

(65) Prior Publication Data

US 2020/0259767 A1 Aug. 13, 2020

(51) Int. Cl.
*G06F 15/16* (2006.01)
*H04L 12/58* (2006.01)
*G06Q 30/00* (2012.01)

(52) U.S. Cl.
CPC ........... *H04L 51/02* (2013.01); *G06Q 30/016* (2013.01)

(58) Field of Classification Search
CPC .............................. H04L 51/02; G06Q 30/016
See application file for complete search history.

(56) References Cited

U.S. PATENT DOCUMENTS

| | | | |
|---|---|---|---|
| 6,442,519 B1 | 8/2002 | Kanevsky et al. | |
| 6,484,136 B1 | 11/2002 | Kanevsky et al. | |
| 8,818,926 B2 | 8/2014 | Wallace | |
| 9,043,407 B1 | 5/2015 | Gaulke et al. | |
| 10,242,668 B2 | 3/2019 | Mun | |
| 2003/0120493 A1 | 6/2003 | Gupta | |
| 2003/0191639 A1 | 10/2003 | Mazza | |
| 2006/0178886 A1 | 8/2006 | Braho et al. | |

(Continued)

FOREIGN PATENT DOCUMENTS

WO 2013192218 A2 12/2013

OTHER PUBLICATIONS

Dillow, C., "How Microsoft's Machine Learning is Breaking the Global Language Barrier", Popular Science [online] Dec. 2014 [retrieved on Oct. 22, 2018]. Retrieved from Internet URL: https://www.popsci.com/how-microsofts-machine-learning-breaking-lan . . . 4 pages.

(Continued)

*Primary Examiner* — Hua Fan

(57) ABSTRACT

Techniques to enable a chat bot system to use metaphors during an interaction with a user are provided. Identification information for the user can be received and can be used to determine a customer group assigned to the user. An initial state of a sequence for resolving an issue of the user can be determined, with the sequence for resolving the issue of the user including a final state wherein the issue of the user is resolved. A metaphor can be selected to include in a question based on the determined customer group assigned to the customer and the determined initial state of the sequence for resolving the issue of the customer. The question can request information from the user relating to the issue of the user. The question can be generated to include the selected metaphor and then provided to the user with a prompt to provide a response.

12 Claims, 10 Drawing Sheets

(56) References Cited

U.S. PATENT DOCUMENTS

| | | |
|---|---|---|
| 2009/0171665 A1 | 7/2009 | Hammerschmidt et al. |
| 2014/0365068 A1 | 12/2014 | Burns et al. |
| 2017/0069314 A1 | 3/2017 | Mun |
| 2017/0358302 A1 | 12/2017 | Orr et al. |
| 2018/0060088 A1 | 3/2018 | Baer et al. |
| 2018/0174580 A1 | 6/2018 | Kim et al. |
| 2018/0211663 A1 | 7/2018 | Shin et al. |
| 2018/0293221 A1 | 10/2018 | Finkelstein et al. |
| 2019/0012714 A1* | 1/2019 | Bright ................ G06Q 30/0617 |

OTHER PUBLICATIONS

Extended European Search Report for European Application No. 19204974.0 dated Mar. 13, 2020, 7 pages.

Dou et al., "DemographicVis: Analyzing Demographic Information based on User Generated Content", 2015 IEEE Conference on Visual Analytics Science and Technology (VAST), dated Oct. 25, 2015, pp. 57-64.

\* cited by examiner

"Can you please describe the solution being sought?"

"What would be the band-aid for this problem?"

| Current State 502 | Next State 404 | Metaphor 1 506 | Value 1 510 | . . . | Metaphor N 506 | Value N 510 |
|---|---|---|---|---|---|---|
| 1 | 2 | | | | | |
| 1 | 3 | | | | | |
| 2 | 4 | | | | | |
| 2 | 5 | | | | | |

CHAT BOT UTILIZING METAPHORS TO BOTH RELAY AND OBTAIN INFORMATION

TECHNICAL FIELD

Embodiments described herein generally relate to chat bot systems.

BACKGROUND

Conventional chat bot systems can conveniently interact with a user to address an issue of the user. However, many conventional chat bot systems come across as robotic and non-human. Users that interact with these conventional chat bot systems find them unrelatable and difficult to understand at times. As a result, these conventional chat bot systems are often poor at extracting information from a user to effectively address the issue of the user.

Accordingly, there is a need for a chat bot system that interacts with users more naturally in a more relatable manner to spur a user to more freely and effectively share information with the chat bot system to better address an issue of the user.

BRIEF DESCRIPTION OF THE DRAWINGS

FIG. 2 illustrates a first message generated by the chat bot system depicted in FIG. 1.

FIG. 3 illustrates a second message generated by the chat bot system depicted in FIG. 1.

FIG. 5 illustrates a table for storing metaphors used by the chat bot system depicted in

FIG. 1.

DETAILED DESCRIPTION

This disclosure presents various systems, components, and methods related to providing more natural and more efficient chat bot systems. Each of the systems, components, and methods disclosed herein provides one or more advantages over conventional systems, components, and methods.

Various embodiments include techniques to enable a chat bot system to use metaphors during an interaction with a user to provide and receive information in a more relatable and efficient manner. Identification information for the user can be received and can be used to determine a customer group assigned to the user. An initial state of a sequence for resolving an issue of the user can be determined, with the sequence for resolving the issue of the user including a final state wherein the issue of the user is resolved. A metaphor can be selected to include in a question based on the determined customer group assigned to the customer and the determined initial state of the sequence for resolving the issue of the customer. The question can request information from the user relating to the issue of the user. The question can then be generated to include the selected metaphor and then provided to the user. The user can subsequently be prompted to provide a response. Other embodiments are disclosed and described.

Figure 1:
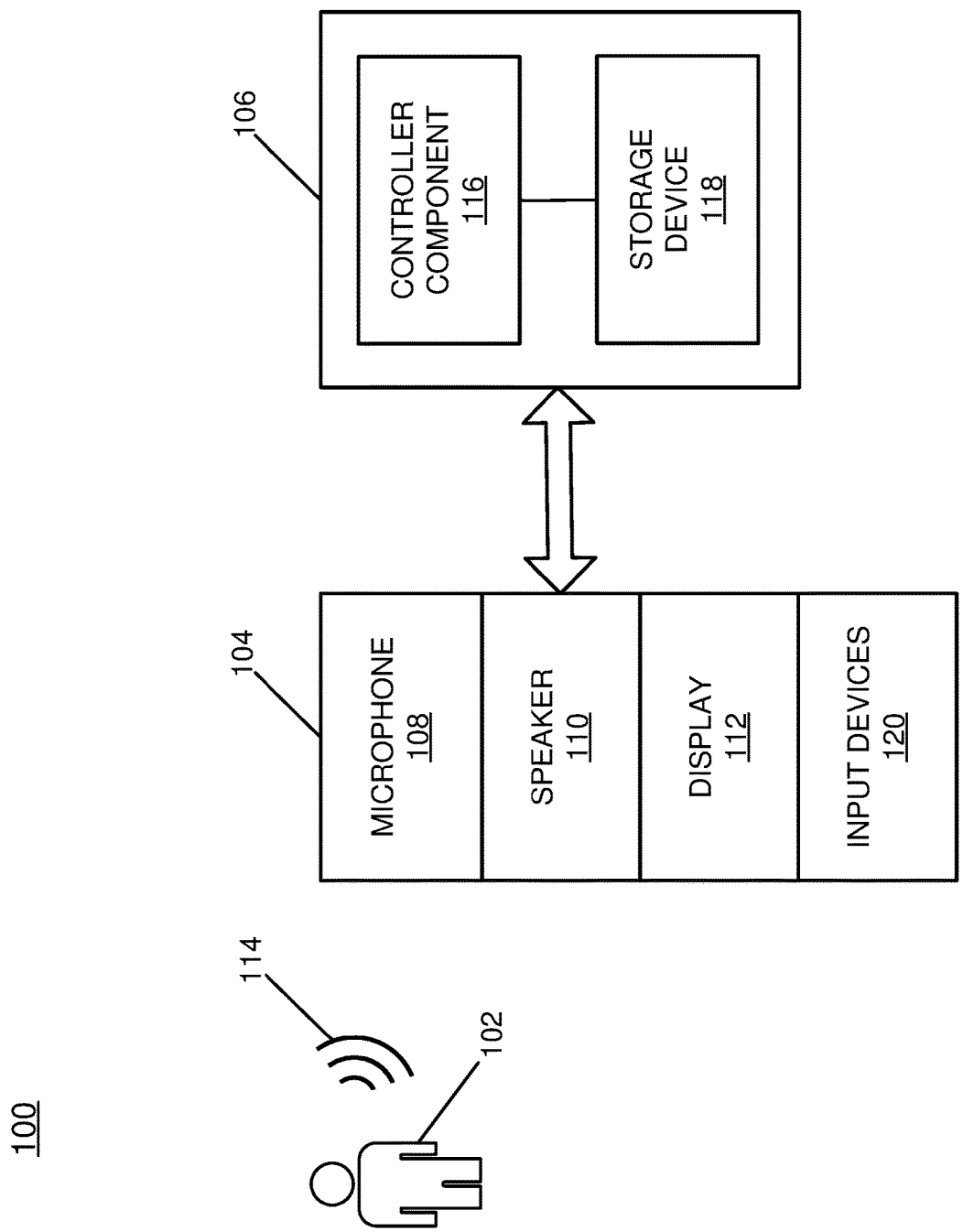
FIG. 1 illustrates an operating environment.

FIG. 1 illustrates an operating environment 100 such as may be representative of various embodiments in which a chat bot utilizing metaphors to interact with a user may be implemented. The operating environment 100 can include a user or customer 102, a first device 104, and a second device 106. In various embodiments, the first device 104 can be a local device that can be a handheld device (e.g., held by the user 102). In various embodiments, the second device 106 can operate to provide a chat bot system or service. The chat bot service provided by the second device 106 can conduct a conversation with the user 102 via auditory or textual based interactions and can include a voice interaction system.

The first and second devices 104 and 106 can be part of the same device or can be portions of different (e.g., physically separated) devices. In various embodiments, the second device 106 can be located remote from the first device 104. For purposes of illustration and for ease of explanation only, the first device 104 will be referred to as a local device and the second device 106 will be referred to as a chat bot system with the understanding that the local device 104 can be part of the chat bot system 106.

In various embodiments, the local device 104 can include a microphone 108, a speaker 110, a display 112, and one or more input devices 120. In various embodiments, the display 112 can be a touchscreen. The microphone 108 can receive audible data or information including spoken or verbalized speech 114 of the user 102. The one or more input devices 120 can include a keyboard for receiving typed data or information from the user 102. The local device 104 can be any type of computing device including, for example, a desktop computer, a laptop computer, a tablet, a mobile computing device, a smartphone, a set-top box, a remote (e.g., a television remote), or any other type of device capable of receiving the speech 114 of the user 102 or textual data from the user 102. The local device 104 can include additional components not shown in FIG. 1.

The chat bot system 106 can include a controller component 116 and a storage device 118. The controller component 116 can be implemented in software, hardware, or any combination thereof. The controller component 116 can be a processor and/or can include logic for implementing the techniques and/or features described herein. The storage device 118 can be any type of memory storage device.

The chat bot system 106 can receive the speech information 114 from the user 102, can process the speech information 114 to determine what was spoken by the user 102, and can respond to the user 102. The chat bot system 106 can also receive textual information from the user 102 provided through the local device 104, can process the textual information to determine what was conveyed by the user, and can respond to the user 102. In various embodiments, the chat bot system 106 can direct the local device 104 to provide audible information back to the user 102 (e.g., by way of the speaker 110) and/or visual information (e.g., textual) back to the user 102 (e.g., by way of the display 112). In general, the user 102 may interact with the chat bot system 106 to request help on an issue such as, for example, any type of customer service issue related to a product or service.

In various embodiments, the local device 104 can receive and store the speech 114 of the user 102 and can provide the stored speech to the chat bot system 106. In various embodiments, the local device 104 can receive and store textual information from the user 102 and can provide the stored textual information to the chat bot system 106. In various embodiments, the local device 104 can include its own controller component and storage device (not shown for simplicity) or can include the controller component 116 and/or the storage device 118 as part of the local device 104 (e.g., to form a combined local device 104-chat bot system 106).

In various embodiments, when the local device 104 and the chat bot system 106 are located remotely from one another, the local device 104 and the chat bot system 106 can communicate and/or share any data or information over a communication link. The data can be any type of data including voice data and/or textual data. The communication link can comprise one more computer networks or links. The communication link can include, for example, one or more wireless communication systems that operate according to one or more wireless communication standards or protocols over any frequency band or range. The communication link can include, for example, one or more wired communication systems that operate according to one or more wired communication standards or protocols over any type of wired media. The local device 104 and the chat bot system 106 can communicate according to any computer network protocol including any Internet-related communication protocol to facilitate the sharing of any type of data between the local device 104 and the chat bot system 106.

The chat bot system 106—either including or not including a portion of the local device 104—can receive audio data and/or textual data from the user 102. The audio data can include the speech 114 of the user 102. In various embodiments, the audio data and/or textual data from the user 102 can relate to an issue of the user 102. For example, the issue can relate to a customer service issue or question of the user 102 including issues relating to operation of a device or service. As an example, the audio data and/or textual data of the user 102 can relate to a question or problem the user 102 has regarding an internet service provided to the user 102. The chat bot system 106 can be a system and/or service provided to the user 102 for responding to customer service issues of the user 102 including troubleshooting issues for any product or service provided to the user 102.

The chat bot system 106 can operate to conduct a conversation with the user 102. The chat bot system 106 can operate to interact with the user 102 to understand the issue or problem of the user 102, collect additional information from the user 102, and to attempt to resolve the issue or problem of the user 102. To provide a more natural conversational interaction with the user 102 and to more efficiently discern the issue or problem of the user 102 as well as resolve the issue or problem of the user 102 more effectively, the chat bot system 106 can use metaphors to relay information to the user 102 and to obtain information from the user 102. In various embodiments, the chat bot system 106 can use a metaphor in place of a predetermined phrase or word or other portion of a menu system to convey and receive information from the user 102 in a more natural and therefore more efficient manner as disclosed herein.

In various embodiments, the user 102 can initiate interaction with the chat bot system 106. The user 102 can initiate interaction with the chat bot system 106 by engaging the local device 104—for example, by textually entering information into the local device 104 or speaking to the local device 104. The local device 104 can store any received audible or textual information from the user 102 and can provide the stored data to the chat bot system 106. The chat bot system 106 can receive the initial information from the user 102. In various embodiments, the chat bot system 106 can determine that the user 102 is experiencing an issue that the user 102 would like help from the chat bot system 106 to resolve.

In various embodiments, to address the issue of the user 102, the chat bot system 106 can first receive identification information for the user. The identification information can be provided by the user 102 through a computer interface provided by the local device 104. In various embodiments, the identification information can be prestored by the local device 104 and/or correlated or related to the local device 104.

After the user 102 is identified, the chat bot system can determine a customer group assigned to the user 102 based on the received user identification information. The storage device 118 of the chat bot system 106 can store an assigned customer group for each possible user that may interact with the chat bot system 106. Information related to each customer group can be stored in the storage device 118. One or more users can be assigned to a specific customer group. Information regarding each customer group can be stored in the storage device 118. The customer groups can include users with similar backgrounds, education levels, familiarity or comfort with the device or service to which the chat bot system 106 may relate, and/or other demographic information.

By assigning users to a customer group, including the user 102, the chat bot system 106 can group related users so that the chat bot system 106 can interact with related users in the same manner. For example, the chat bot system 106 can interact with a first set of users assigned to a first customer group in a first manner while interacting with a second set of users assigned to a second customer group in a second different manner. The manner in which the chat bot system 106 may interact with the customer groups can vary, for instance, by a set of provided menu options, a sequence in which the options are provided, and the use of metaphors used to relay and obtain information. For example, the chat bot system 106 may use certain metaphors with the first customer group and may use different metaphors with the second customer group, with both different sets of metaphors intended to enhance interaction with each customer group (e.g., by more effectively conveying and receiving information from the users).

In various embodiments, the chat bot system 106 can model interaction with the user 102 as a sequence of steps or states. In various embodiments, the chat bot system 106 can model the interaction as having an initial state, a final state, and one or more intermediate states. The overall sequence of states can involve determining a problem or issue of the user 102, collecting additional information from the user 102 to better understand the issue and/or to guide the user 102 to a solution, and reaching a state where a satisfactory solution for the user 102 is obtained. The initial state can be determined based on an initial interaction with user 102 and can be any state along the modeled sequence. In general, the initial state can represent the user 102 attempting to covey the issue or problem to the chat bot system 106 or may simply be the user 102 initializing contact with the chat bot system 106 without stating the issue to be addressed. The final state can represent resolving the issue of the user 102. The one or more intermediate states can represent states that sequentially advance to the final state through interaction between the user 102 and the chat bot system 106.

In various embodiments, the chat bot system 106 can interact with the user 102 to sequentially advance the resolution of the issue of the user from a determined initial problem state to the final state by collecting information from the user 102 and/or providing information or instructions to the user 102. In this way, the resolution of the problem can advance through the one or more intermediate states towards the final state. Information can be collected by the chat bot system 106 by asking the user 102 questions related to the issue. The questions asked by the chat bot system 106 to the user 102—for example, for any determined state relating to a sequence for resolving the issue of the user 102—can be based on a number of inputs including, for example, the issue of the user 102, the current state of the resolution sequence, and the customer group assigned to the user 102.

In various embodiments, in order to advance the resolution of the issue for the user 102, the chat bot system 106 can use one or more metaphors within a question posed to the user 102 or within any other statement provided to the user 102. The metaphor can be selected to increase a likelihood of receiving information from the user 102 that enables the chat bot system 106 to advance to a next state sequentially closer to the final state (i.e., to further advance understanding of the issue and a possible solution).

To this end, in various embodiments, the chat bot system 106 can generate a question for the user 102 and can include the selected metaphor within the question. The chat bot system 106 can provide the generated question for presentation to the user 102 through the local device 104—for example, as audible information conveyed to the user 102 though the speaker 110 or as textual information conveyed to the user through the display 112. The user 102 can respond to the presented question and can include responsive information. The responsive information can include information that allows the chat bot system 106 to advance to a next state closer to the final state or can fail to include information that allows the chat bot system to advance to the next closer state (e.g., the user 102 may fail to understand the metaphor and is unable to respond such that the resolution sequence remains in the same or current state). This sequence of interaction can be repeated to sequentially advance the resolution sequence for the user 102 to the final state.

In various embodiments, the chat bot system 106 can track and rate the successfulness of using a particular metaphor. For example, each metaphor that can be used by the chat bot system 106 can be associated with a value representing a likelihood that the metaphor will prompt the user 102 to respond with information that enables the chat bot system 106 to advance the sequence for resolving the issue of the user 102. In various embodiments, the likelihood value can vary by customer group, the current state of the sequence for resolving the issue, and the particular problem of the user 102. The chat bot system 106 can select from any number of stored metaphors. In various embodiments, the chat bot system 106 can select the metaphor having the highest likelihood value associated with it.

If the use of a metaphor results in information that enables the chat bot system 106 to advance the resolution of the issue of the user 102, then the chat bot system 106 can store information indicating successful use of the metaphor and/or can increase the stored likelihood value corresponding to the metaphor. If the use of a metaphor does not result in information that enables the chat bot system 106 to advance the resolution of the issue of the user 102, then the chat bot system 106 can store information indicating the unsuccessful use of the metaphor and/or can decrease the stored likelihood value corresponding to the metaphor. In this manner, the chat bot system 106 can dynamically learn which metaphors are more successful for certain situations (e.g., problem resolution states) and which are less successful for future use.

FIG. 2 illustrates a first example message 200 generated by the chat bot system 106 for presentation to the user 102. The first example message 200 can be generated by the chat bot system 106 for presentation as a textual message or an audible message for the user 102. The first example message 200 can be provided to the user 102 through the user interface provided by the local device 104.

The first example message 200 can represent an instance where a question is presented to the user 102 without the use of a selected metaphor by the chat bot system 106. Many users may find the example message 200 overly complex and unrelatable.

FIG. 3 illustrates a second example message 300 generated by the chat bot system 106 for presentation to the user 102. The second example message 300 can be generated by the chat bot system 106 for presentation as a textual message or an audible message for the user 102. The second example message 300 can be provided to the user 102 through the user interface provided by the local device 104.

The second example message 300 can be presented to the user 102 in lieu of the first example message 200. The second example message 300 can represent an instance where a question is presented to the user 102 with the use of a selected metaphor 302 by the chat bot system 106. By including the metaphor 302 within the message 300, many users may be more likely to provide more useful information for resolving the issue of the user 102 as the metaphor is simple and relatable.

Figure 4:
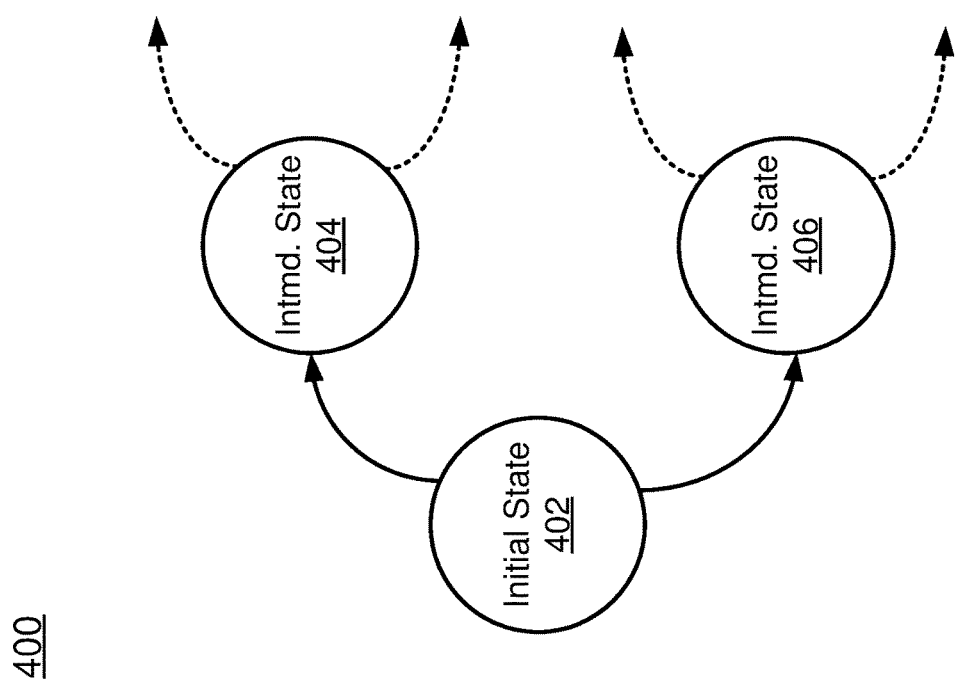
FIG. 4 illustrates a state diagram representing an interaction between a user and the chat bot system depicted in FIG. 1.

FIG. 4 illustrates a simplified state diagram 400 representing an interaction of the chat bot system 106 and the user 102. The state diagram 400 can represent different possible states that can occur as the chat bot system 106 interacts with the user 102 to address the issue of the user. As shown in FIG. 4, an initial state 402 can represent the initial state of the interaction between the chat bot system 106 and the user 102. The initial state 402 can represent, for example, when communication between the chat bot system 106 and the user 102 is first established and prior to the user 102 stating the problem for which the user 102 is seeking help. In other embodiments, the user 102 can state the problem of the user 102 in the initial state 402.

FIG. 4 further illustrates a first intermediate state 404, a second intermediate state 406, and a final state 408, with the understanding that additional intermediate states (not shown in FIG. 4 for simplicity) can be represented between the first and second intermediate states 404 and 406 and the final state 406. The final state 408 can represent the resolution of the issue of the user 102. The intermediate states (e.g., the first and second intermediate states 404 and 406 and other intermediate states not shown in FIG. 4) can represent the incremental advancement of the interaction between the chat bot system 106 and the user 102 towards the final state 408. These intermediate states can represent interactions for which the chat bot system 106 attempts to collect or provide information regarding the issue of the user 102, collect or provide information regarding the status of any service or device related to the issue of the user 102, or any other step in a sequence of resolving the issue of the user 102 that incremental advances the interaction to the final state 408.

In various embodiments, each step or state shown in the state diagram 400 can represent a state where a certain amount of information related to the issue of the user is obtained by the chat bot system 106. For example, a state positioned sequentially closer to the final state 408 can represent a state where more information related to the issue of the user 102 is known in comparison to the amount of information known in a state positioned sequentially further from the final state 408. The known information can represent any information related to the issue of the user 102 including, for example, information to understand the problem of the user 102, information regarding the status of the device or service related to the issue of the user 102, and/or any other information that when provided to the chat bot system increases a likelihood of reaching the final state 408.

Any number of states can be represented in the state diagram 400. Any number of paths can be followed to advance from the initial state 402 to the final state 408, with shorter paths (with fewer total states) representing more efficient problem resolution sequences and longer paths (with more total states) representing less efficient problem resolution sequences. Any number of paths can lead to or from any state. In general, to efficiently resolve the issue of the user 102, it is desirable for the chat bot system 106 to take the shortest path (e.g., with the fewest intermediate states) from the initial state 406 to the final state 408. Techniques disclosed herein enable the chat bot system 106 to relay and obtain information with the user 102 using metaphors such that transitions between problem resolution states can be made to advance the sequence of problem resolution toward the final state 408.

As shown in FIG. 4, from the initial state 402, the interaction between the chat bot system 106 and the user 102 can advance to either the first intermediate state 404 or the second intermediate state 406. In various embodiments, it may be desirable to advance to the first intermediate state 404 over the second intermediate state 406. Accordingly, the chat bot system 106 may attempt to interact with the user 102—for example, by requesting information from the user 102—to enable the sequence for resolving the issue of the user 102 to advance to the first intermediate state 404.

To do so, in various embodiments, during the initial state 402 of the interaction, the chat bot system 106 may receive identification information for the user 102 and may look-up within the storage device 118 the customer group assigned to the user 102. A number of options may be provided to the chat bot system 106 during the initial state 402 of the interaction for advancing to the first intermediate state 404. For example, a number of questions or information to request can be stored in the storage device 118 and selected by the chat bot system 106 to provide to the user 102. In various embodiments, the storage device 118 may store one or more corresponding metaphors for the different possible interactions the chat bot system 106 can implement. The chat bot system 106 can select one of the metaphors to use in a question to the user 102 in an attempt to advance to the first intermediate state 404.

In various embodiment, the chat bot system 106 can select the use of a metaphor that has the highest likelihood for advancing to the first intermediate state 404 based on the user 102, the customer group assigned to the user 102, the issue of the user (if known), and/or the determined initial state 402. Therefore, in an attempt to advance resolution of the issue of the user 102 to the first intermediate state 404, the chat bot system 106 can generate a question for the user 102 that includes use of the selected metaphor. The generated question including the selected metaphor can then be provided to the user 102. The user 102 can then respond to the question.

If the user 102 relates well to the use of the selected metaphor in the question, then the user 102 may respond with information that enables the chat bot system 106 to advance resolution of the issue to the first intermediate state 404 (e.g., the desired information to collect was provided by the user 102). If the user 102 fails to understand the metaphor or relate to its use, the user 102 may not respond with information that enables the chat bot system 106 to advance resolution of the issue to the first intermediate state 404 (e.g., the user 102 may state that they do not understand the posed question). As a result, the sequence for resolution may remain in the initial state 402. Another attempt by the chat bot system 106 to advance to the first intermediate state 404 or any other state can then occur.

This process can be repeated as necessary or desired for the chat bot system 106 to incrementally advance the sequence for resolving the issue of the user 102 toward the final state 408. For any attempt to incrementally advance the sequence for resolving the issue of the user 102, the chat bot system 106 can determine whether or not to use a metaphor in an audible or textual interaction with the user 102 along with selecting which metaphor to use. Each determination by the chat bot system 106 can be based on, for example, the customer group of the user 102 and the current state of the sequence for resolving the issue.

The state diagram 400 can represent a visual depiction of the process undertaken by the chat bot system 106 to resolve the issue of the user 102. In various embodiment, the state diagram 400 can represent a model for the process that can be undertaken by the chat bot system 106 to resolve the issue of the user 102. Accordingly, the state diagram 400 can be a model having states stored in the storage device 118. Further, the state diagram 400 can vary for each customer or customer group. In various embodiments, the state diagram 400 can be implemented or can represent a Hidden Markov Model (HMM).

FIG. 5 illustrates a table 500 that can be stored in the storage device 118 and maintained by the chat bot system 106. The table 500 can be used as a reference for storing candidate metaphors for use during an interaction between the chat bot system 106 and the user 102. The table 500 is shown with headings of different types of information stored in the table 500 and values for the headings are not shown for simplicity. FIG. 5 can show a portion of the table 500 for simplicity.

As shown in FIG. 5, the table 500 can organize information relating to a current state 502 of the interaction between the chat bot system 106 and the user 102. For each possible current state 502 provided in the table 500, a next state 504 (e.g., a desired next state) of the interaction between the chat bot system 106 and the user 102 can be listed. For each current state 502 and next state 504 pair, one or more candidate metaphors can be stored. As shown in FIG. 5, a first metaphor 506 is shown and an nth metaphor 508 is shown, with the nth metaphor 508 indicating than n different metaphors (where n is an integer) are listed for a specific current state 502 and next state 504 pair.

As further shown in FIG. 5, each metaphor is associated with a value. For example, the first metaphor 506 is associated with a value 510 and the nth metaphor 508 is associated with a value 512. The value 510 can represent a likelihood that the first metaphor 506, when used in a message to the user 102, will result in the user 102 providing responsive information that enables the chat bot system 106 to advance resolution of the issue of the user 102 to the next state 504. Similarly, the value 512 can represent a likelihood that the nth metaphor 508, when used in a message to the user 102, will result in the user 102 providing responsive information that enables the chat bot system 106 to advance the resolution of the issue of the user 102 to the next state

504. In various embodiments, the chat bot system 106 can select the metaphor having the highest corresponding likelihood value.

In various embodiments, the table 500 can be maintained across all customer groups. In various embodiments, the table 500 can be maintained for a specific customer group with other tables maintained for other corresponding customer groups. The chat bot system 106 can adjust the stored values 510 and 512 based on the successful or unsuccessful use of the metaphors in an attempt to advance to any next state 504. For example, if the first metaphor 506 is used in a message to the user 102 but is unsuccessful in extracting desired information from the user 102 in a response that enables advancement to the next state 504, then the chat bot system 106 can reduce or decrease the stored value 510. Alternatively, if the first metaphor 506 is used in a message to the user 102 and is successful in extracting desired information from the user 102 in a response that enables advancement to the next state 504, then the chat bot system 106 can increase the stored value 510. In this manner, the table 500 can be dynamically updated based on usage of the stored metaphors and then applied to other customers within a particular customer group.

In various embodiments, the table 500 can store a plurality of metaphors for each possible state transition and separate tables can be established for each customer group. The metaphors can include any alternative words or phrases (e.g., pseudonyms or synonyms) used in replace of other words or phrases. The metaphors can be used to map between a conventional word or phrasing and the selected metaphor. In this way, conventional keywords, terms, or phrases of a menu system can be translated to a specific metaphor. The metaphors can vary for each customer group or can be stored in different manners between tables for each customer group with different likelihood values.

In various embodiments, metaphors stored in the table 500 can be selected based on a statistical analysis of the possible metaphors—for example, by selecting metaphors having the highest likelihood of advancing to a next desired problem resolution state that is sequentially closer to the final state 408. In various embodiments, a machine learning model such as a recurrent neural network (RNN) can be used to develop a bank of stored metaphors that can be used and tested for receptiveness by the user 102.

In various embodiments, metaphor data—for example, metaphor data stored in the table 500 or otherwise maintained and stored for use in any embodiment disclosed herein—can be maintained in one or more relational lists. For example, a list can be maintained that relates common words or phrases to one or more metaphors that can be used in lieu of the common words or phrases. The common words or phrases can be information or options stored as part of a menu system such that predetermined alternative metaphors can be mapped to portions of the menu system. In this way, metaphors can be maintained and retrieved for use as an alternative to certain menu words, phrases, options, or questions, for example. As disclosed herein, the relational mapping for the metaphor data can be constructed prior to implementation of the chat bot system 106, during implementation of the chat bot system 106 (e.g., built and modified during implementation), or can be purchased or otherwise acquired for use with the chat bot system 106. Further, relational mapping for the metaphor data can be developed through machine learning as disclosed herein. In a similar manner, mapping from metaphor data from a user to related common words or phrases (e.g., as they may relate to a menu system) can also be implemented. As an example of either type of mapping, search lists can be constructed and reviewed to translate a common word, phrase, or question to a metaphor, or vice versa.

Figure 6:
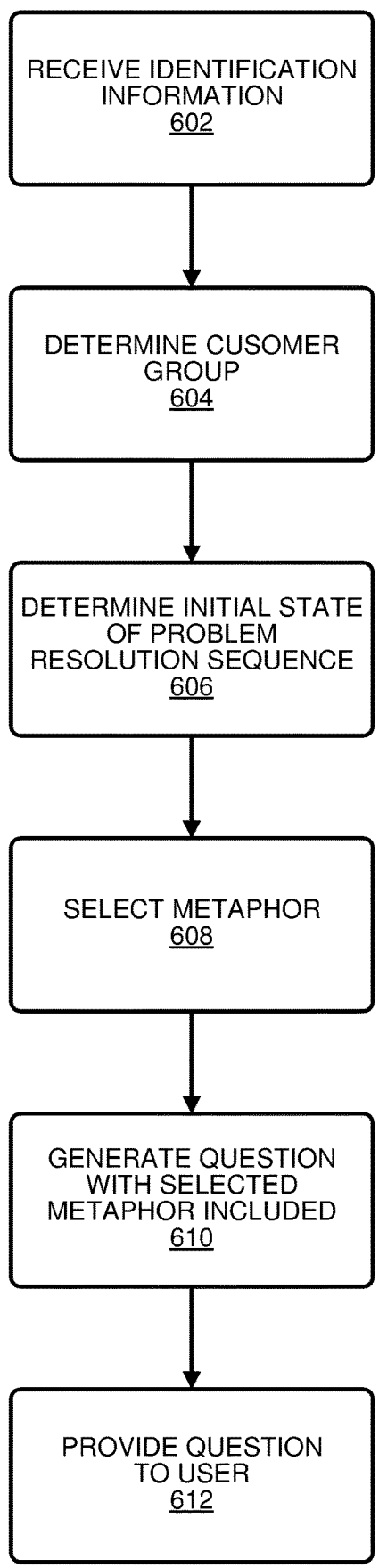
FIG. 6 illustrates a first logic flow.

FIG. 6 illustrates an example of a logic flow 600 that may be representative of a chat bot system that uses metaphors during an interaction with a user. For example, the logic flow 600 may be representative of operations that may be performed in various embodiments by the chat bot system 106 in the operating environment 100 of FIG. 1.

At 602, the chat bot system 106 can receive identification information for a customer or user 102 through a user interface of a computing device. The computing device can be the local device 104. In various embodiments, the local device 104 can be associated with a specific customer such that the local device 104 can inform the chat bot system 106 as to the identity of the customer 102 operating the local device 104. In various embodiments, the local device 104 can store identification information for the customer 102 that is provided to the chat bot system 106. In various embodiments, the customer 102 can provide identification information through a user interface provided by the local device 104.

At 604, the chat bot system 106 can determine a customer group assigned to the customer 102. Data indicating the customer group assigned the customer 102 can be stored in the storage device 118. The chat bot system 106 can determine the customer group assigned to the customer 102 based on the on the received identification information for the customer.

At 606, the chat bot system 106 can determine an initial state of a sequence for resolving an issue of the customer. In various embodiments, the customer 102 can initiate an interaction with the chat bot system 106 to request resolution of a problem or issue. A process for resolving the problem or issue can be viewed or represented as a sequence of steps or states, with a final state of the sequence representing resolution of the issue. The initial state can be an introductory state of interaction where the customer 102 simply engages the chat bot system 106. In various embodiments, the initial state can represent a state where certain information related to the user 102 issue or problem is relayed by the user 102. By determining the initial state, the chat bot system 106 can then determine a next state within the sequence for resolving the issue that the chat bot system 106 may decide to advance to if possible and based on interaction with the user 102.

At 608, the chat bot system 106 can select a metaphor stored in the storage device to include in a question that is to be provided to the user 102. The metaphor can be selected based on the determined customer group assigned to the customer 102 and the determined initial state of the sequence for resolving the issue of the customer 102. The question can be generated to request information from the customer 102 relating to the issue of the customer 102. In various embodiments, in lieu of a question, the chat bot system can generate a statement that includes the metaphor.

At 610, the chat bot system can generate the question (or statement) with the question including the selected metaphor. The generated question can be prepared for transmission to the user 102.

At 612, the generated question (or statement) that includes the selected metaphor can be provided to the customer 102 by the chat bot system 106. The generated question can be provided to the user 102 through the local device 104. In various embodiments, the generated question can be provided to the user 102 as a textual message through the display 112 of the local device 104. In various embodiments, the generated question can be provided to the user 102 as an auditory message through the speaker 110 of the local device 104. At 612, the user 102 can also be prompted to respond to the provided question. The user 102 can then subsequently respond to the generated question—either audibly or textually—to further interaction between the user 102 and the chat bot system 106.

Figure 7:
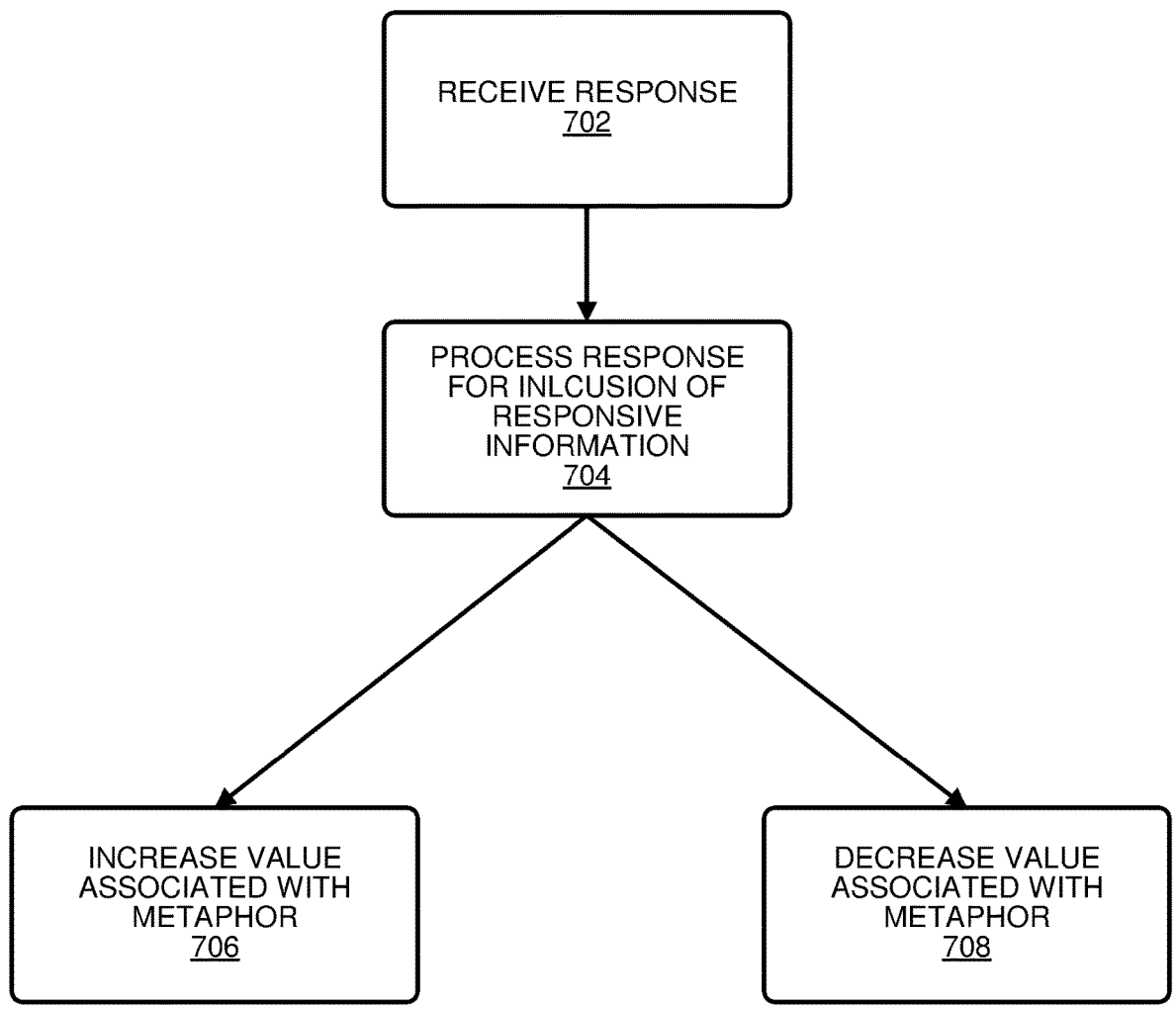
FIG. 7 illustrates a second logic flow.

FIG. 7 illustrates an example of a logic flow 700 that may be representative of a chat bot system obtaining information from a user. For example, the logic flow 700 may be representative of operations that may be performed in various embodiments by the chat bot system 106 in the operating environment 100 of FIG. 1.

At 702, the chat bot system 106 can receive a response to a question provided to the user 102 (e.g., the question provided at 612 of logic flow 600). The response can be provided by the user 102 through the user interface provided by the local device 104. In various embodiments, the response can be provided as a textual message or as an auditory message.

At 704, the chat bot system 106 can review and process the received response. The chat bot system 106 can determine if the received response includes responsive information to advance the sequence for resolving the issue of the customer 102—for example, from a previously determined initial state to a next state, where the next state is sequentially closer to a final state of the sequence for resolving the issue of the customer.

At 706, if it is determined that the response from the user 102 includes sufficient responsive information, then the chat bot system 106 can increase a stored value associated with a metaphor that was selected to be included in the question provided to the user 102 to which the user 102 responded. The stored value associated with the selected metaphor can represent a likelihood that the selected metaphor will cause the response of the user 102 to include responsive information for advancing the sequence for resolving the issue of the customer 102 from the determined initial state to the next state.

At 708, if it is determined that the response from the user 102 does not include sufficient responsive information, then the chat bot system 106 can decrease the stored value associated with the metaphor that was selected to be included in the question provided to the user 102 to which the user 102 responded.

Figure 8:
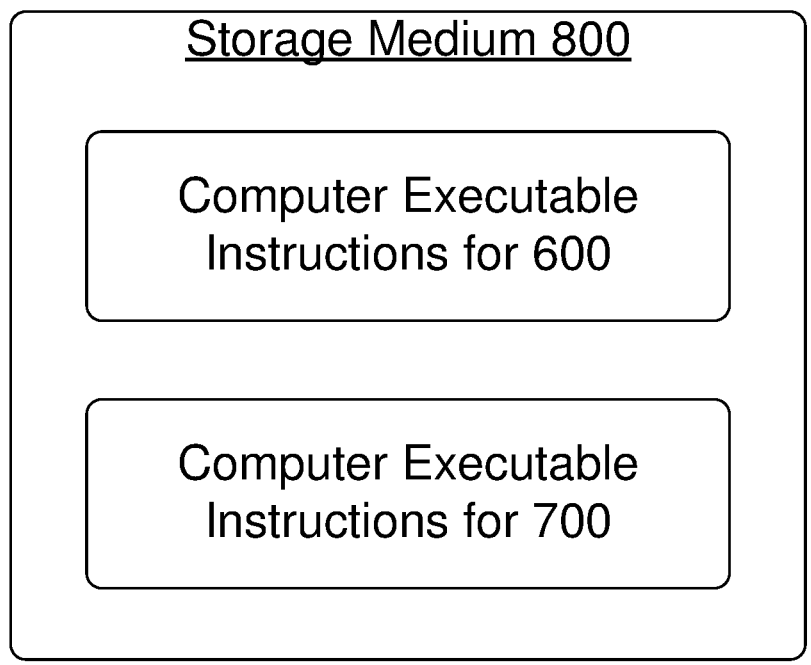
FIG. 8 illustrates a storage medium.

FIG. 8 illustrates a storage medium 800. Storage medium 800 may represent an implementation of the storage device 118. The storage medium 800 can comprise any non-transitory computer-readable storage medium or machine-readable storage medium. In various embodiments, the storage medium 800 can comprise a physical article of manufacture. In various embodiments, storage medium 800 can store computer-executable instructions, such as computer-executable instructions to implement one or more of logic flows or operations described herein, such as the logic flow 600 of FIG. 6 and/or the logic flow 700 of FIG. 7. In various embodiments, storage medium 800 can store computer-executable instructions, such as computer-executable instructions to implement any of the features or functions of any of the components described in FIG. 1. Examples of a computer-readable storage medium or machine-readable storage medium can include any tangible media capable of storing electronic data. Examples of computer-executable instructions can include any type of computer readable code.

Figure 9:
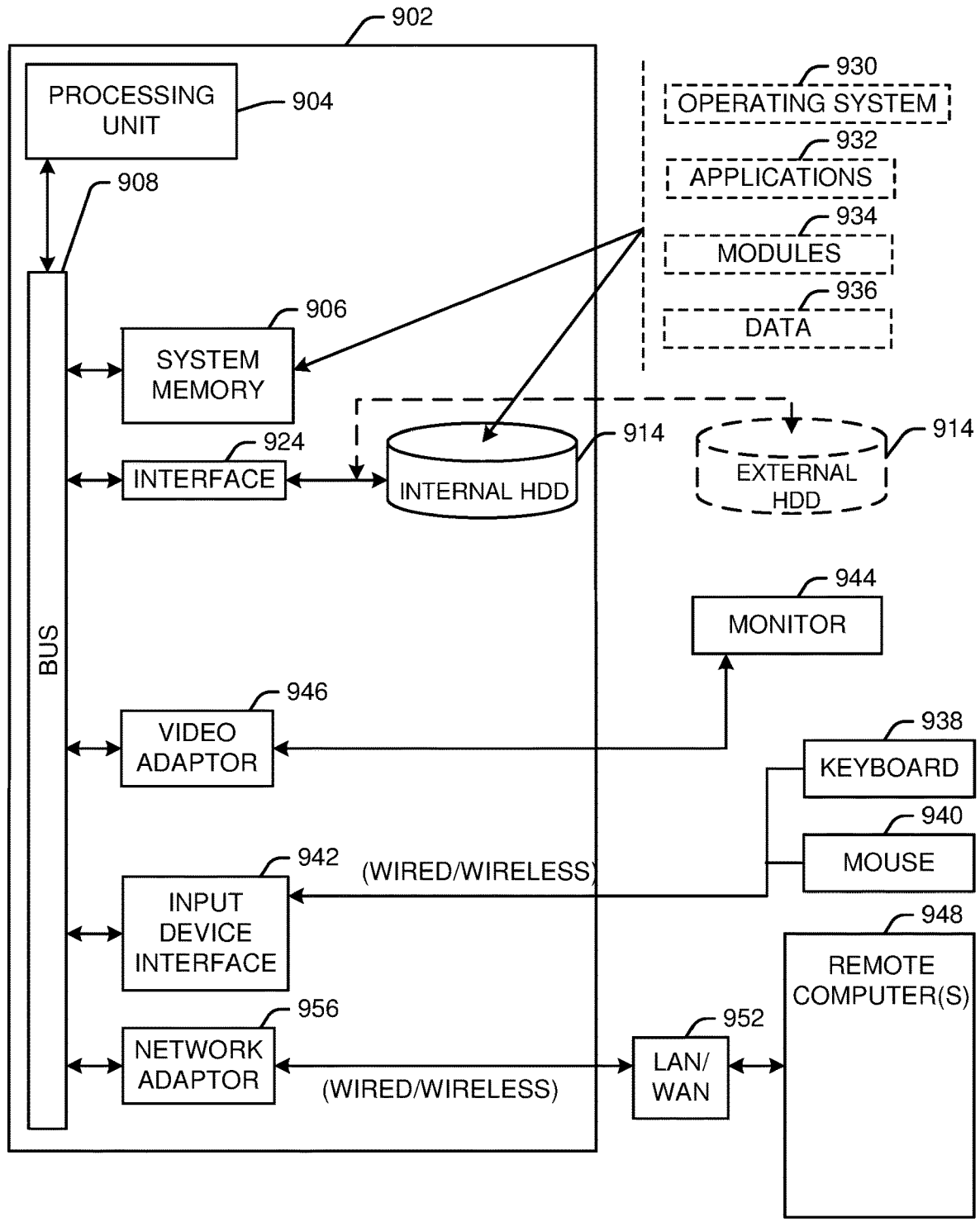
FIG. 9 illustrates a computing architecture.

FIG. 9 illustrates a computing architecture 900 that can implement various embodiments described herein. In various embodiments, the computing architecture 900 can comprise or be implemented as part of an electronic device. In various embodiments, the computing architecture 900 can represent an implementation of the local device 104 and/or the chat bot system 106. In various embodiments, the computing architecture 900 can represent an implementation of the chat bot 106 for interacting with the user 102

The computing architecture 900 can include various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth.

As shown in FIG. 9, the computing architecture 900 can comprise a computer 902 having a processing unit 904, a system memory 906 and a system bus 908. The processing unit 904 can be any of various commercially available processors or can be a specially designed processor.

The system bus 908 provides an interface for system components including, but not limited to, an interface between the system memory 906 and the processing unit 904. The system bus 908 can be any of several types of bus structure that may further interconnect to a memory bus (with or without a memory controller), a peripheral bus, and a local bus using any of a variety of commercially available bus architectures.

The system memory 906 can include any type of computer-readable storage media including any type of volatile and non-volatile memory. The computer 902 can include any type of computer-readable storage media including an internal (or external) hard disk drive (HDD) 914. In various embodiments, the computer 902 can include any other type of disk drive such as, for example, a magnetic floppy disk and/or an optical disk drive. The HDD 914 can be connected to the system bus 908 by a HDD interface 924.

In various embodiments, any number of program modules can be stored in the drives and memory units 906 and/or 914 such as, for example, an operating system 930, one or more application programs 932, other program modules 934, and program data 936.

A user can enter commands and information into the computer 902 through one or more wired/wireless input devices such as, for example, a keyboard 938 and a pointing device, such as a mouse 940. These and other input devices can be connected to the processing unit 904 through an input device interface 942 that is coupled to the system bus 908. A monitor 944 or other type of display device can also be connected to the system bus 908 via an interface, such as a video adaptor 946. The monitor 944 may be internal or external to the computer 902.

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a smartphone, a tablet, a peer device or other common network node, and typically includes many or all of the elements described relative to the computer 902. The logical connections depicted include wired and/or wireless connectivity to networks 952 such as, for example, a local area network (LAN) and/or larger networks, for example, a wide area network (WAN). Networks 952 can provide connectivity to a global communications network such as, for example, the Internet. A network adapter 956 can facilitate wired and/or wireless communications to the networks 952. The computer 902 is operable to communicate over any known wired or wireless communication technology, standard, or protocol according to any known computer networking technology, standard, or protocol.

Figure 10:
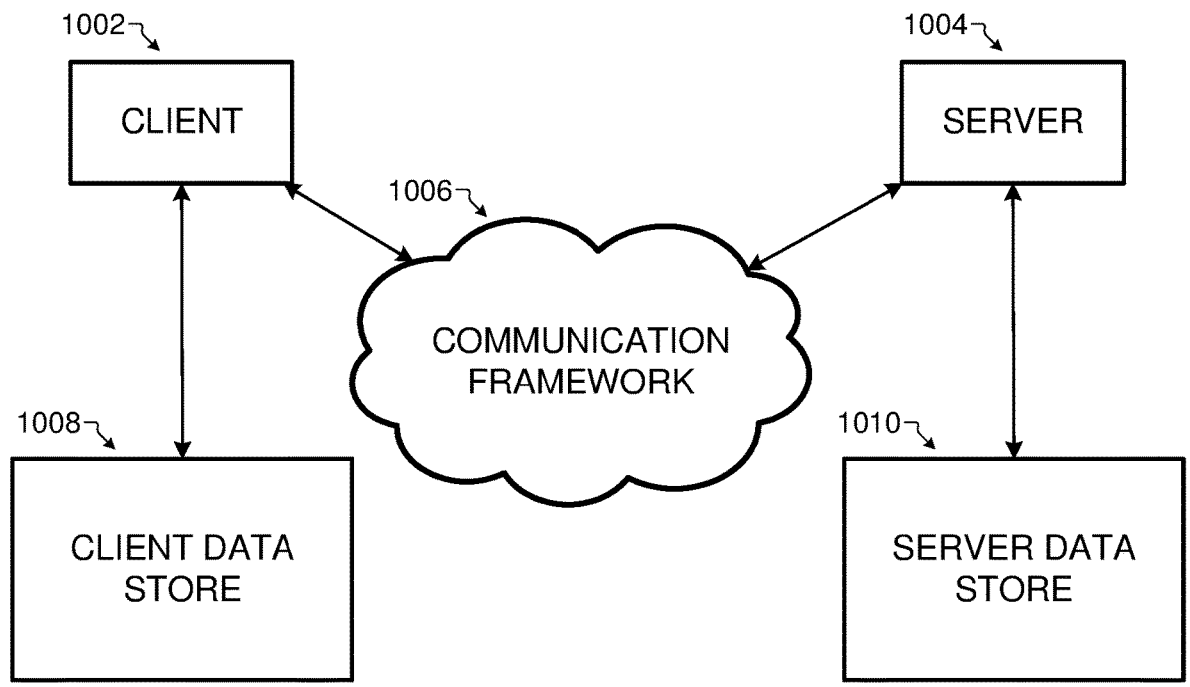
FIG. 10 illustrates a communication architecture.

FIG. 10 illustrates a block diagram of a communication architecture 1000. The communication architecture 1000 can implement various embodiments described herein. As shown in FIG. 10, the communication architecture 1000 comprises one or more clients 1002 and servers 1004. The client 1002 can represent an implementation of the local device 104 and/or use of the local device 104 to interact with the chat bot system 106. One of the servers 1004 can represent an implementation of the chat bot system 106 and/or operation of the chat bot system 106 to interact with the user 102 as described herein.

The client 1002 and the server 1004 can be operatively connected to a client data store 1008 and a server data store 1010, respectively, that can be employed to store information local to the respective client 1002 and server 1004. In various embodiments, the server 1004 can implement one or more of logic flows or operations described herein and/or any of the functions and features described in relation to chat bot system 106.

The client 1002 and the server 1004 can communicate data or other information between each other using a communication framework 1006. The communications framework 1006 can implement any known communications technique or protocol. The communications framework 1006 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 1006 can operate over any communication media according to any networking technology including any wired or wireless communications standard or protocol, or any combination thereof.

The following set of examples pertain to further embodiments.

Example 1 is an apparatus comprising a storage device and logic, at least a portion of the logic implemented in circuitry coupled to the storage device, the logic to receive identification information for a customer through a user interface of a computing device, determine a customer group assigned to the customer and stored in the storage device based on the received identification information for the customer, determine an initial state of a sequence for resolving an issue of the customer, the sequence for resolving the issue of the customer including a final state wherein the issue of the customer is resolved, select a metaphor stored in the storage device to include in a question based on the determined customer group assigned to the customer and the determined initial state of the sequence for resolving the issue of the customer, the question requesting information from the customer relating to the issue of the customer, generate the question, the question to include the selected metaphor, and provide the question including the selected metaphor to the customer and prompt the customer to respond to the provided question, the question provided through at least one of an electronic audio device and a display of the computing device.

Example 2 is an extension of Example 1 or any other example disclosed herein, the logic to receive a response to the provided question from the customer and to determine if the received response includes responsive information to advance the sequence for resolving the issue of the customer from the determined initial state to a next state, the next state sequentially closer to the final state of the sequence for resolving the issue of the customer.

Example 3 is an extension of Example 2 or any other example disclosed herein, the logic to increase a value associated with the selected metaphor when the received response includes responsive information to advance the sequence for resolving the issue of the customer from the determined initial state to the next state, the value representing a likelihood of the selected metaphor for advancing the sequence for resolving the issue of the customer from the determined initial state to the next state.

Example 4 is an extension of Example 3 or any other example disclosed herein, the logic to decrease the value associated with the selected metaphor when the received response does not include responsive information to advance the sequence for resolving the issue of the customer from the determined initial state to the next state.

Example 5 is an extension of Example 4 or any other example disclosed herein, the logic to select the metaphor from a plurality of candidate metaphors, each candidate metaphor assigned a value representing a likelihood of the candidate metaphor for advancing the sequence for resolving the issue of the customer from the determined initial state to the next state.

Example 6 is an extension of Example 5 or any other example disclosed herein, the selected metaphor having a highest assigned value of the plurality of candidate metaphors.

Example 7 is an extension of Example 1 or any other example disclosed herein, the logic to assign the customer to the customer group based on at least one of demographic information of the customer, an education level of the customer, and a prior interaction with the customer.

Example 8 is an extension of Example 1 or any other example disclosed herein, the logic to present the question to the customer in a textual message on the display of the computing device.

Example 9 is an extension of Example 1 or any other example disclosed herein, the logic to present the question to the customer in an auditory message through the electronic audio device.

Example 10 is a method comprising receiving identification information for a customer, determining a customer group assigned to the customer based on the received identification information for the customer, determining an initial state of a sequence for resolving an issue of the customer, the sequence for resolving the issue of the customer including a final state wherein the issue of the customer is resolved, determining a metaphor to include in a question based on the determined customer group assigned to the customer and the determined initial state of the sequence for resolving the issue of the customer, the question requesting information from the customer relating to the issue of the customer, generating the question, the question to include the selected metaphor, providing the question including the selected metaphor to the customer, and requesting the customer to respond to the presented question.

Example 11 is an extension of Example 10 or any other example disclosed herein, further comprising receiving a response from the customer to the provided question.

Example 12 is an extension of Example 11 or any other example disclosed herein, further comprising determining if the received response includes responsive information to advance the sequence for resolving the issue of the customer from the determined initial state to a next state, the next state sequentially closer to the final state of the sequence for resolving the issue of the customer.

Example 13 is an extension of Example 12 or any other example disclosed herein, further comprising increasing a stored value corresponding to the selected metaphor when the received response includes the responsive information, the stored value representing a likelihood of the selected metaphor for advancing the sequence for resolving the issue of the customer from the determined initial state to the next state.

Example 14 is an extension of Example 13 or any other example disclosed herein, further comprising decreasing the stored value when the received response does not include the responsive information.

Example 15 is an extension of Example 10 or any other example disclosed herein, further comprising determining the metaphor from a plurality of candidate metaphors, each candidate metaphor assigned a value representing a likelihood of the candidate metaphor for advancing the sequence for resolving the issue of the customer from the determined initial state to the next state.

Example 16 is an extension of Example 15 or any other example disclosed herein, the determined metaphor having a highest assigned value of the plurality of candidate metaphors.

Example 17 is at least one non-transitory computer-readable medium comprising a set of instructions that, in response to being executed on a computing device, cause the computing device to receive identification information for a customer, determine a customer group assigned to the customer based on the received identification information for the customer, determine an initial state of a sequence for resolving an issue of the customer, the sequence for resolving the issue of the customer including a final state wherein the issue of the customer is resolved, select a metaphor to include in a question based on the determined customer group assigned to the customer and the determined initial state of the sequence for resolving the issue of the customer, the question requesting information from the customer relating to the issue of the customer, generate the question, the question to include the selected metaphor, and provide the question including the selected metaphor to the customer and prompt the customer to respond to the presented question.

Example 18 is an extension of Example 17 or any other example disclosed herein, the computing device to select the metaphor from a set of candidate metaphors, each candidate metaphor corresponding to a stored value representing a likelihood for advancing the sequence for resolving the issue of the customer to a next state sequentially closer to the final state, the selected metaphor having the largest stored value of the set of candidate metaphors.

Example 19 is an extension of Example 17 or any other example disclosed herein, the computing device to present the question to the customer in a textual message.

Example 20 is an extension of Example 17 or any other example disclosed herein, the computing device to present the question to the customer in an auditory message.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. An apparatus, comprising:
a storage device; and
logic, at least a portion of the logic implemented in circuitry coupled to the storage device, the logic to:
  receive identification information for a customer through a user interface of a computing device;
  determine a customer group assigned to the customer and stored in the storage device based on the received identification information for the customer;
  determine an initial state of a sequence for resolving an issue of the customer, the sequence for resolving the issue of the customer including a final state wherein the issue of the customer is resolved;
  select a metaphor stored in the storage device to include in a question based on the determined customer group assigned to the customer and the determined initial state of the sequence for resolving the issue of the customer, the question requesting information from the customer relating to the issue of the customer;
  generate the question, the question to include the selected metaphor;
  provide the question including the selected metaphor to the customer and prompt the customer to respond to the provided question, the question provided through at least one of an electronic audio device and a display of the computing device;
  receive a response to the provided question from the customer;
  determine if the received response includes responsive information to advance the sequence for resolving the issue of the customer from the determined initial state to a next state, the next state sequentially closer to the final state of the sequence for resolving the issue of the customer;
  in response to determining the received response includes responsive information to advance the sequence for resolving the issue of the customer from the determined initial state to the next state, increase a value associated with the selected metaphor, the value representing a likelihood of the selected metaphor for advancing the sequence for resolving the issue of the customer from the determined initial state to the next state; and in response to determining the received response does not include responsive information to advance the sequence for resolving the issue of the customer from the determined initial state to the next state, decrease the value associated with the selected metaphor.

2. The apparatus of claim 1, the logic to select the metaphor from a plurality of candidate metaphors, each candidate metaphor assigned a corresponding value representing a likelihood of advancing the sequence for resolving the issue of the customer from the determined initial state to the next state.

3. The apparatus of claim 2, the selected metaphor having a highest assigned value of the plurality of candidate metaphors.

4. The apparatus of claim 1, the logic to assign the customer to the customer group based on at least one of demographic information of the customer, an education level of the customer, and a prior interaction with the customer.

5. The apparatus of claim 1, the logic to present the question to the customer in a textual message on the display of the computing device.

6. The apparatus of claim 1, the logic to present the question to the customer in an auditory message through the electronic audio device.

7. A method, comprising:

receiving identification information for a customer;

determining a customer group assigned to the customer based on the received identification information for the customer;

determining an initial state of a sequence for resolving an issue of the customer, the sequence for resolving the issue of the customer including a final state wherein the issue of the customer is resolved;

determining a metaphor to include in a question based on the determined customer group assigned to the customer and the determined initial state of the sequence for resolving the issue of the customer, the question requesting information from the customer relating to the issue of the customer;

generating the question, the question to include the determined metaphor;

providing the question including the determined metaphor to the customer;

requesting the customer to respond to the presented question;

receiving a response from the customer to the provided question;

determining if the received response includes responsive information to advance the sequence for resolving the issue of the customer from the determined initial state to a next state, the next state sequentially closer to the final state of the sequence for resolving the issue of the customer;

in response to determining the received response includes the responsive information, increasing a stored value corresponding to the determined metaphor, the stored value representing a likelihood of the selected metaphor for advancing the sequence for resolving the issue of the customer from the determined initial state to the next state; and in response to determining the received response does not include the responsive information decreasing the stored value.

8. The method of claim 7, further comprising determining the metaphor from a plurality of candidate metaphors, each candidate metaphor assigned a value representing a likelihood of the candidate metaphor for advancing the sequence for resolving the issue of the customer from the determined initial state to the next state.

9. The method of claim 8, the determined metaphor having a highest assigned value of the plurality of candidate metaphors.

10. At least one non-transitory computer-readable medium comprising a set of instructions that, in response to being executed on a computing device, cause the computing device to:

receive identification information for a customer;

determine a customer group assigned to the customer based on the received identification information for the customer;

determine an initial state of a sequence for resolving an issue of the customer, the sequence for resolving the issue of the customer including a final state wherein the issue of the customer is resolved;

select a metaphor to include in a question based on the determined customer group assigned to the customer and the determined initial state of the sequence for resolving the issue of the customer, the question requesting information from the customer relating to the issue of the customer, wherein the metaphor is selected from a set of candidate metaphors, each candidate metaphor corresponding to a stored value representing a likelihood for advancing the sequence for resolving the issue of the customer to a next state sequentially closer to the final state, the selected metaphor having the largest stored value of the set of candidate metaphors;

generate the question, the question to include the selected metaphor; and provide the question including the selected metaphor to the customer and prompt the customer to respond to the provided question.

11. The at least one non-transitory computer-readable medium of claim 10, the computing device to present the question to the customer in a textual message.

12. The at least one non-transitory computer-readable medium of claim 10, the computing device to present the question to the customer in an auditory message.

\* \* \* \* \*